United States Patent
Li et al.

(10) Patent No.: US 10,621,971 B2
(45) Date of Patent: Apr. 14, 2020

(54) METHOD AND DEVICE FOR EXTRACTING SPEECH FEATURE BASED ON ARTIFICIAL INTELLIGENCE

(71) Applicant: BAIDU ONLINE NETWORK TECHNOLOGY (BEIJING) CO., LTD., Beijing (CN)

(72) Inventors: Chao Li, Beijing (CN); Xiangang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 169 days.

(21) Appl. No.: 15/850,873

(22) Filed: Dec. 21, 2017

(65) Prior Publication Data

US 2018/0182377 A1    Jun. 28, 2018

(30) Foreign Application Priority Data

Dec. 28, 2016    (CN) .......................... 2016 1 1239071

(51) Int. Cl.
  *G10L 15/02*    (2006.01)
  *G10L 15/22*    (2006.01)
  (Continued)

(52) U.S. Cl.
  CPC ............ *G10L 15/02* (2013.01); *G06K 9/4628* (2013.01); *G06K 9/6274* (2013.01); *G06N 3/04* (2013.01);
  (Continued)

(58) Field of Classification Search
  CPC ......... G10L 15/02; G10L 15/16; G10L 15/22; G10L 15/24; G10L 15/30; G10L 25/18;
  (Continued)

(56) References Cited

U.S. PATENT DOCUMENTS

| 5,550,924 A * | 8/1996 | Helf | ................... G10L 21/0208 |
| | | | 381/94.3 |
| 2017/0330586 A1* | 11/2017 | Roblek | ............... G06F 11/0715 |

FOREIGN PATENT DOCUMENTS

| CN | 104616664 | 5/2015 |
| CN | 106128465 | 11/2016 |

OTHER PUBLICATIONS

Toth, COmbining Time and Frequency Domain Convolution in Convolutional Neural Netwodk-Based Phone Recognition, 2014, IEEE (Year: 2014).*

(Continued)

*Primary Examiner* — Sonia L Gay
(74) *Attorney, Agent, or Firm* — Hodgons Russ LLP

(57) ABSTRACT

Embodiments of the present disclosure provide a method and a device for extracting a speech feature based on artificial intelligence. The method includes performing a spectrum analysis on a speech to be recognized, to obtain a spectrum program of the speech; and extracting features of the spectrum program by using an Inception convolution structure of an image recognition algorithm, to obtain the speech feature of the speech. In embodiments, by performing the spectrum analysis on the speech to be recognized, the consecutive speech to be recognized is converted into the spectrum diagram. As the Inception convolution structure is an effective image recognition manner being able to accurately recognize features of an image, the spectrum program is recognized with the Inception convolution structure to extract the relative accurate speech feature from the speech to be recognized. Thus, the accuracy rate of the speech recognition is improved.

18 Claims, 6 Drawing Sheets a spectrum analysis is performed on a speech to be recognized, to obtain a spectrum program of the speech — 101 features of the spectrum program are extracted by using an Inception convolution structure of an image recognition algorithm, to obtain the speech feature of the speech — 102

(51) Int. Cl.
*G10L 15/16* (2006.01)
*G10L 25/18* (2013.01)
*G06N 3/08* (2006.01)
*G06N 3/04* (2006.01)
*G06K 9/62* (2006.01)
*G06K 9/46* (2006.01)
*G10L 15/24* (2013.01)
*G10L 15/30* (2013.01)

(52) U.S. Cl.
CPC .............. *G06N 3/0454* (2013.01); *G06N 3/08* (2013.01); *G10L 15/16* (2013.01); *G10L 15/22* (2013.01); *G10L 15/24* (2013.01); *G10L 15/30* (2013.01); *G10L 25/18* (2013.01)

(58) Field of Classification Search
CPC ...... G06K 9/4628; G06K 9/6274; G06N 3/04; G06N 3/0454; G06N 3/08
See application file for complete search history.

(56) References Cited

OTHER PUBLICATIONS

Hamid, Convolutional Neural Networks for Speech Recognition, 2014, IEEE (Year: 2014).*

Lukic et al., "Speaker Identification and Clustering Using Convolutional Neural Networks," 2016 IEEE International Workshop on Machine Learning for Signal Processing, Sep. 2016, 6 pages.

Szegedy et al., "Going deeper with convolutions," 2015 IEEE Conference on Computer Vision and Pattern Recognition, Jun. 2015, 12 pages.

Wang, "Research on Audio Feature Extraction and Context Recognition Based on Deep Neural Networks," Dissertation for the Master Degree in Engineering, Harbin Institute of Technology, Jul. 2015, 56 pages.

SIPO, First Office Action for CN Application No. 201611239071, dated Mar. 21, 2019.

* cited by examiner

METHOD AND DEVICE FOR EXTRACTING SPEECH FEATURE BASED ON ARTIFICIAL INTELLIGENCE

CROSS-REFERENCE TO RELATED APPLICATIONS

This application is based on and claims a priority to Chinese Patent Application Serial No. 201611239071.2, filed on Dec. 28, 2016, the entire content of which is incorporated herein by reference.

TECHNICAL FIELD

The present disclosure relates to the field of information processing technology, and more particularly, to a method and a device for extracting a speech feature based on artificial intelligence.

BACKGROUND

Artificial Intelligence (short for AI) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The speech recognition is a most important aspect of the artificial intelligence.

With the increasing popularity of speech search service, more and more people begin to use their speech to search information, and a proportion of the speech search is increasing year by year. During a process of searching via speech, the speech needs to be recognized firstly to obtain a recognition result. Then the search is performed based on the recognition result. At present, the speech is recognized usually by using a Neural Network Model. However, an accuracy rate of the speech recognition in the related art is poor.

SUMMARY

Embodiments of the present disclosure provide a method for extracting a speech feature based on artificial intelligence. The method includes: performing a spectrum analysis on a speech to be recognized, to obtain a spectrum program of the speech; and extracting features of the spectrum program by using an Inception convolution structure of an image recognition algorithm, to obtain the speech feature of the speech.

Embodiments of the present disclosure provide a device for extracting a speech feature based on artificial intelligence. The device includes: a processor; a memory, configured to store instructions executable by the processor; in which the processor is configured to: perform a spectrum analysis on a speech to be recognized, to obtain a spectrum program of the speech; and extract features of the spectrum program by using an Inception convolution structure of an image recognition algorithm, to obtain the speech feature of the speech.

Embodiments of the present disclosure provide a non-transitory computer readable storage medium. When instructions stored in the storage medium is executed by a processor of a server terminal, a method for extracting a speech feature based on artificial intelligence may be executed by the server terminal. The method includes: performing a spectrum analysis on a speech to be recognized, to obtain a spectrum program of the speech; and extracting features of the spectrum program by using an Inception convolution structure of an image recognition algorithm, to obtain the speech feature of the speech.

Embodiments of the present disclosure provide a computer program product. When instructions in the computer program product are executed by a processor, a method for extracting a speech feature based on artificial intelligence is performed. The method includes: performing a spectrum analysis on a speech to be recognized, to obtain a spectrum program of the speech; and extracting features of the spectrum program by using an Inception convolution structure of an image recognition algorithm, to obtain the speech feature of the speech.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
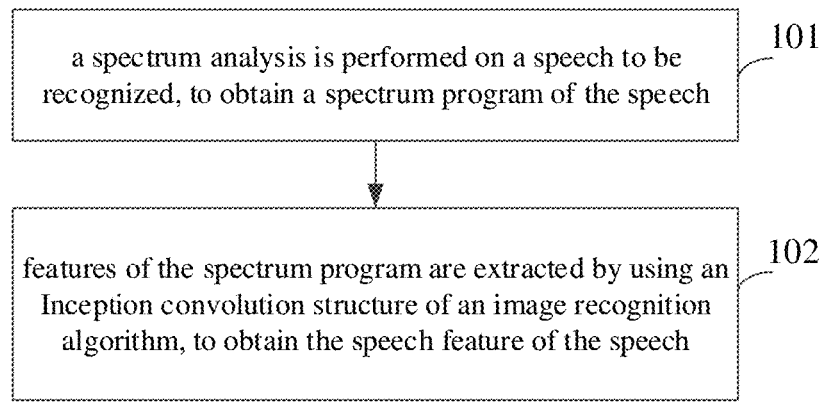
FIG. 1 is a flow chart illustrating a method for extracting a speech feature based on artificial intelligence according to embodiments of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and a device for extracting a speech feature based on artificial intelligence according to embodiments of the present disclosure will be described with reference to the drawings.

FIG. 1 is a flow chart illustrating a method for extracting a speech feature based on artificial intelligence according to embodiments of the present disclosure. The method includes followings.

At act S101, a spectrum analysis is performed on a speech to be recognized, to obtain a spectrum program of the speech.

In detail, the speech to be recognized is sampled by a preset period, to obtain frames of the speech to be recognized. In embodiments, filter groups are set previously. Each filter group includes a preset number of filters. Different filters are set with different frequencies. Further, each frame is filtered by using the filter groups each including the preset number of filters. As the frequency of each filter included in the filter groups is different from one to another, spectrum components of each frame are obtained after each frame is filtered with the filter groups.

Further, after the spectrum components of each frame are obtained, a fast Fourier transform is performed on each frame to obtain spectrum values of each frame. The spectrum values are representative of short-term average energy of the respective frame. The spectrum program of the speech to be recognized is generated with the spectrum values of each frame. A horizontal coordinate of the spectrum program denotes time corresponding to each frame, a longitudinal coordinate of the spectrum program denotes a frequency component corresponding to each frame, and values of intersections between the horizontal coordinate and the longitudinal coordinate denote the spectrum values.

Figure 2:
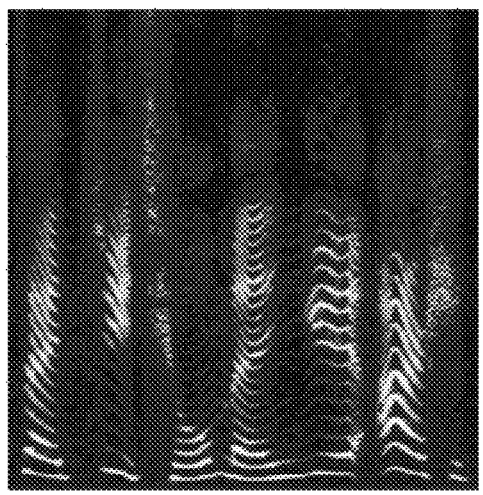
FIG. 2 is a schematic diagram illustrating a spectrum diagram of a speech to be recognized according to embodiments of the present disclosure.

For example, a sample period may be set as 10 ms. Then, the frames are formed every 10 ms (that is, the length of each frame is 10 ms). The filter group including 40 filters is set. Each frame with the length of 10 ms is filtered by the filter group to obtain a filter-bank feature of each frame. As there are 40 filters included in the filter group, 40 filter-bank features may be extracted from one frame after the one frame is filtered by the filter group. A two-dimensional image is depicted for the consecutive speech to be recognized according to the extracted 40 filter-bank features. That is, the spectrum program of the speech to be recognized is formed, as illustrated in FIG. 2.

At act S102, features of the spectrum program are extracted by using an Inception convolution structure of an image recognition algorithm, to obtain the speech feature of the speech.

In embodiments, for improving the accuracy of the speech recognition, the Inception convolution structure of the image recognition algorithm may be added into an acoustic model. The spectrum program of the speech to be recognized is recognized with the Inception convolution structure to obtain the speech feature of the speech to be recognized. In detail, the Inception convolution structure includes a plurality of convolution modules. Each convolution module includes a plurality of convolution layers and one pooling layer. The pooling layer is configured to perform a down-sampling in time domain and/or frequency domain. As the speech to be recognized is sampled by the preset period when the spectrum program is generated, that is, the down-sampling is performed once on the speech to be recognized in the time domain when the spectrum program is generated, in embodiments, a summed down-sampling rate in the time domain is smaller than a summed down-sampling rate in the frequency domain, on each pooling layer.

The summed down-sampling rate in the time domain is determined according to a granularity of performing a speech classification on the speech to be recognized. For example, the granularity may be a phone-granularity or a word-granularity. The summed down-sampling rates in the Inception convolution structure are different according to different granularities. For example, when the phone-granularity is used (that is, the phone is used as the granularity), the summed down-sampling rate in the time domain of the Inception convolution structure is preferably ¼. When the word-granularity is used (that is, the word is used as the granularity), the summed down-sampling rate in the time domain of the Inception convolution structure is preferably ⅛.

Further, in the Inception convolution structure, the number of filters included in a poster convolution module is integer multiple of that included in an adjacent former convolution module. For example, if the Inception convolution structure includes four convolution modules, the number of the filters included in a second convolution module is integer multiple of that included in a first convolution module, the number of the filters included in a third convolution module is integer multiple of that included in the second convolution module, and the number of the filters included in a fourth convolution module is integer multiple of that included in the third convolution module. For example, if the number of the filters included in the first convolution module is 64, the number of the filters included in the second convolution module is 128. The rest can be done in the same manner, the number of the filters included in the third convolution module is 256, and the number of the filters included in the fourth convolution module is 512.

Further, when the number of the filters included in each convolution module is determined, a Directed Acyclic Graph (DAG for short) of each convolution module may be constructed according to the number of the filters included in each convolution module. Then, layers included in each convolution module are connected according to the constructed DAG.

The layers included in each convolution module of the Inception convolution structure are connected according to the DAG, and then the convolution modules can be connected in sequence to generate a connected Inception convolution structure. The speech feature may be extracted from the spectrum program by using the connected Inception convolution structure.

With the method according to embodiments of the present disclosure, by performing the spectrum analysis on the speech to be recognized, the spectrum program of the speech to be recognized is obtained, by extracting the features of the spectrum program via using the Inception convolution structure of the image recognition algorithm, the speech feature of the speech to be recognized is obtained. In embodiments, by performing the spectrum analysis on the speech to be recognized, the consecutive speech to be recognized is converted into the spectrum program. As the Inception convolution structure is an effective image recognition manner being able to accurately recognize features of an image, the spectrum program is recognized with the Inception convolution structure to extract the relative accurate speech feature from the speech to be recognized. Thus, the accuracy rate of the speech recognition is improved. As the Inception convolution structure may extract the speech feature, the Inception convolution structure may be used as an independent speech feature-extracting layer in an acoustic module, thereby overcoming a problem that the accuracy rate of the speech recognition is poor resulting from an absence of the special feature-extracting layer in the acoustic model in the related art.

Figure 3:
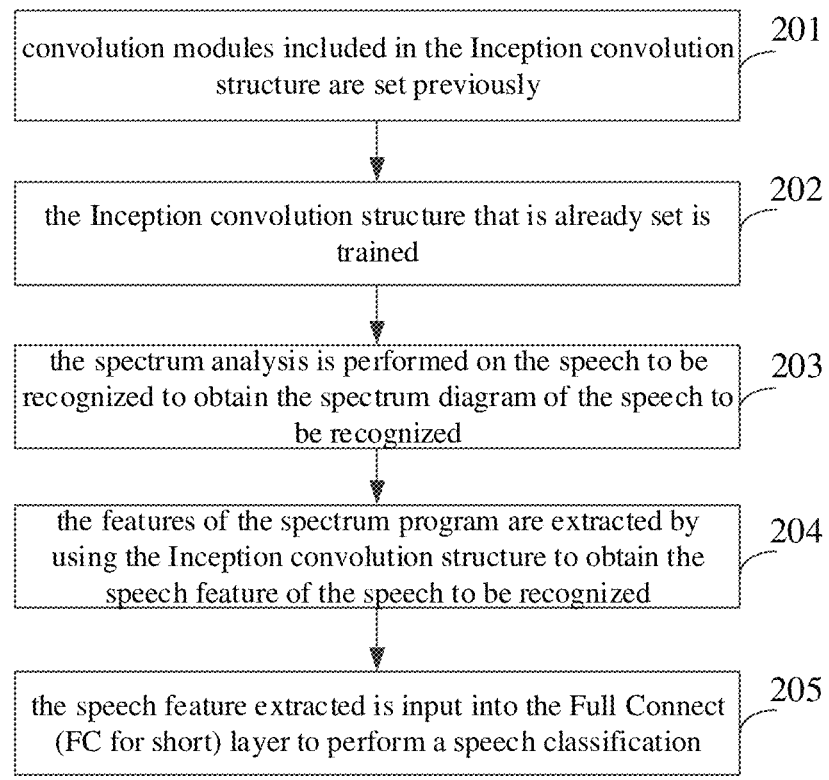
FIG. 3 is a flow chart illustrating another method for extracting a speech feature based on artificial intelligence according to embodiments of the present disclosure.

FIG. 3 is a flow chart illustrating another method for extracting a speech feature based on artificial intelligence according to embodiments of the present disclosure. The method includes followings.

At act S201, convolution modules included in the Inception convolution structure are set previously.

In embodiments, one Inception convolution structure is set previously. The Inception convolution structure may include a plurality of convolution modules. Each convolution module includes one branching layer, a plurality of convolution layers with different convolution kernels, one pooling and one feature stitching layer. The number of the filters included in each convolution module may be set differently. The convolution kernel of each convolution layer included in each convolution module, a scale of the pooling layer, and a convolution stride may be set previously.

The pooling layer is configured to perform the down-sampling in the time domain and/or in the frequency domain on the spectrum program. As the speech to be recognized is sampled by the preset period when the spectrum program is generated, that is, the down-sampling is performed once on the speech to be recognized in the time domain when the spectrum program is generated, in embodiments, the summed down-sampling rate in the time domain is smaller than the summed down-sampling rate in the frequency domain, on each pooling layer.

Preferably, the Inception convolution structure includes 4 convolution modules. The first convolution module and the second convolution module both include: the one branching layer, four convolution layers with the convolution kernels of 1*1, one convolution layer with the convolution kernel of 3*3, one convolution layer with the convolution kernel of 5*1 and one convolution layer with the convolution kernel of 1*5, the one pooling layer and the one feature stitching layer. The convolution layer with the convolution kernel of 5*1 and the convolution layer with the convolution kernel of 1*5 are constructed into one convolution layer with the convolution kernel of 5*5. The scale of the pooling layer is 2*2, and the convolution stride is 1*1.

The third convolution layer and the fourth convolution layer both include: the one branching layer, four convolution layers with the convolution kernels of 1*1, one convolution layer with the convolution kernel of 3*3, one convolution layer with the convolution kernel of 7*1 and one convolution layer with the convolution kernel of 1*7, the one pooling layer and the one feature stitching layer. The convolution layer with the convolution kernel of 7*1 and the convolution layer with the convolution kernel of 1*7 are constructed into one convolution layer with the convolution kernel of 7*7. The scale of the pooling layer is 2*2, and the convolution stride is 1*1.

The number of the filters included in the first convolution module is set to be 64, the number of the filters included in the second convolution module is set to be 128, the number of the filters included in the third convolution module is set to be 256, and the number of the filters included in the fourth convolution module is set to be 512.

Further, the down-sampling rates in the time domain and in the frequency domain are set for each convolution module, on the pooling layers. ½ down-sampling is performed both in the time domain and in the frequency domain for the first convolution module, on the pooling layer. ½ down-sampling is performed both in the time domain and in the frequency domain for the second convolution module, on the pooling layer. ½ down-sampling is performed in the frequency domain for the third convolution module, on the pooling layer. ½ down-sampling is performed in the frequency domain for the fourth convolution module, on the pooling layer. In embodiments, the summed down-sampling rate in the time domain is smaller than the summed down-sampling rate in the frequency domain, on each pooling layer.

At act S202, the Inception convolution structure that is already set is trained.

After the Inception convolution structure is set above, the Inception convolution structure may be trained with a large amount of simple spectrum programs, to obtain a steady Inception convolution structure.

Figure 4:
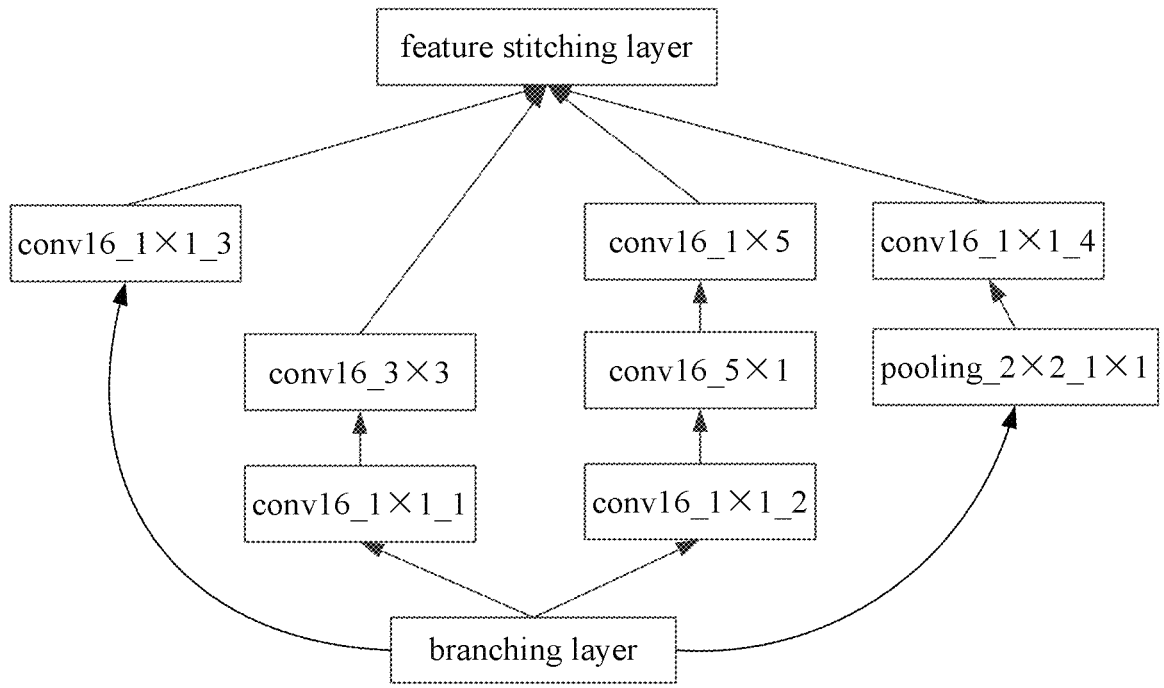
FIG. 4 is a schematic diagram illustrating a first convolution module according to embodiments of the present disclosure.

FIG. 4 is a schematic diagram illustrating a first convolution module according to embodiments of the present disclosure. As illustrated in FIG. 4, the first convolution module includes one branching layer, four convolution layers with the convolution kernels of 1*1 and with 16 filters (denoted as conv16_1×1_1, conv16_1×1_2, conv16_1×1_3 and conv16_1×1_4 in FIG. 4), one convolution layer with the convolution kernel of 3*3 and with 16 filters (denoted as conv16_3×3 in FIG. 4), one convolution layer with the convolution kernel of 5*1 and with 16 filters (denoted as conv16_5×1 in FIG. 4), and one convolution layer with the convolution kernel of 1*5 and with 16 filters (denoted as conv 16_1×5 in FIG. 4). The convolution layer with the convolution kernel of 5*1 and with 16 filters and the convolution layer with the convolution kernel of 1*5 and with 16 filters may be constructed into one convolution layer with the convolution kernel of 5*5 and with 16 filters. Further, the first convolution module also includes one pooling layer and one feature stitching layer. The scale of the pooling layer is 2*2, and the convolution stride is 1*1, denoted as pooling_2×2_1×1 in FIG. 4. The ½ down-sampling is performed both in the time domain and in the frequency domain for the first convolution module, on the pooling layer.

The branching layer divides a received input into 4 branches. As illustrated in FIG. 4, the first branch passes through the convolution layer with the convolution kernel of 1*1, the convolution layer with the convolution kernel of 3*3, and is input into the feature stitching layer. The second branch passes through the convolution layer with the convolution kernel of 1*1, the convolution layer with the convolution kernel of 5*1, the convolution layer with the convolution kernel of 1*5 and is input into the feature stitching layer. The third branch passes through the convolution layer with the convolution kernel of 1*1, and is input into the feature stitching layer. The fourth branch passes through the pooling layer, the convolution layer with the convolution kernel of 1*1 and is input into the feature stitching layer.

Figure 5:
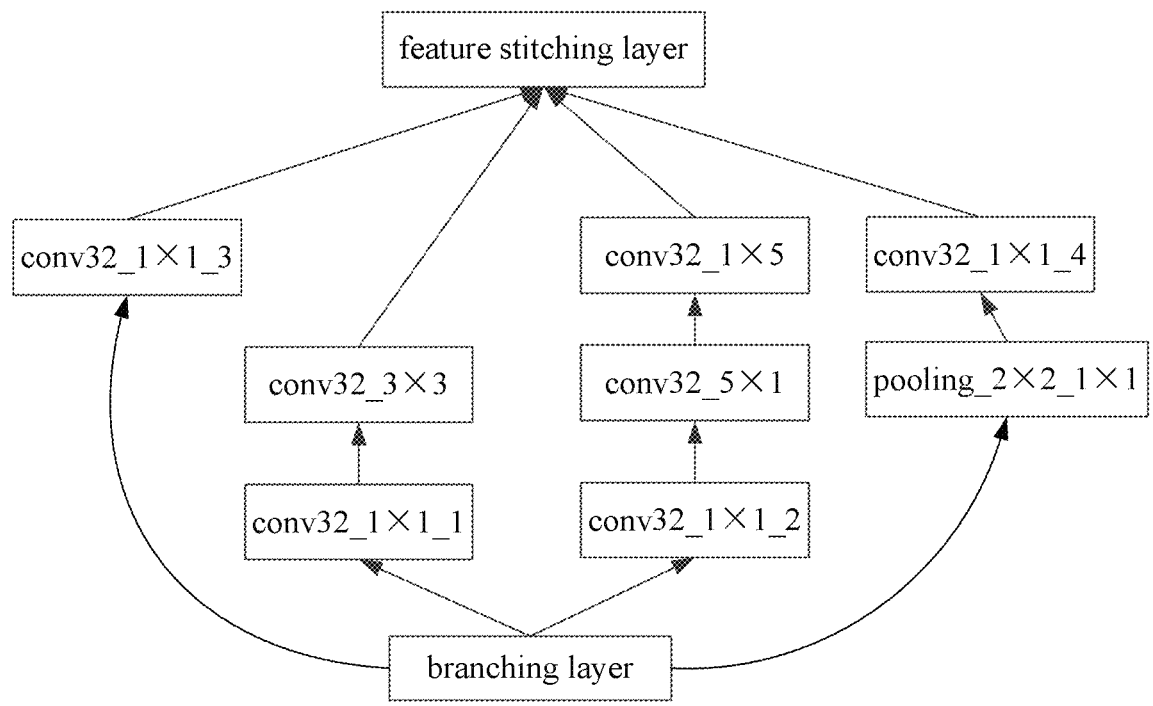
FIG. 5 is a schematic diagram illustrating a second convolution module according to embodiments of the present disclosure.

FIG. 5 is a schematic diagram illustrating a second convolution module according to embodiments of the present disclosure. As illustrated in FIG. 5, the second convolution module includes one branching layer, four convolution layers with the convolution kernels of 1*1 and with 32 filters (denoted as conv32_1×1_1, conv32_1×1_2, conv32_1×1_3, conv32_1×1_4 in FIG. 5), one convolution layer with the convolution kernel of 3*3 and with 32 filters (denoted as conv32_3×3 in FIG. 5), one convolution layer with the convolution kernel of 5*1 and with 32 filters (denoted as conv32_5×1 in FIG. 5), and one convolution layer with the convolution kernel of 1*5 and with 32 filters (denoted as conv32_1×5 in FIG. 5). The convolution layer with the convolution kernel of 5*1 and with 32 filters and the convolution layer with the convolution kernel of 1*5 and with 32 filters may be constructed into one convolution layer with the convolution kernel of 5*5 and with 32 filters. Further, the second convolution module also includes one pooling layer and one feature stitching layer. The scale of the pooling layer is 2*2, and the convolution stride is 1*1, denoted as pooling_2×2_1×1 in FIG. 5. The ½ down-sampling is performed both in the time domain and in the frequency domain for the second convolution module, on the pooling layer.

The branching layer divides a received input into 4 branches. As illustrated in FIG. 5, the first branch passes through the convolution layer with the convolution kernel of 1*1, the convolution layer with the convolution kernel of 3*3, and is input into the feature stitching layer. The second branch passes through the convolution layer with the convolution kernel of 1*1, the convolution layer with the convolution kernel of 5*1, the convolution layer with the convolution kernel of 1*5 and is input into the feature stitching layer. The third branch passes through the convolution layer with the convolution kernel of 1*1, and is input into the feature stitching layer. The fourth branch passes through the pooling layer, the convolution layer with the convolution kernel of 1*1 and is input into the feature stitching layer.

Figure 6:
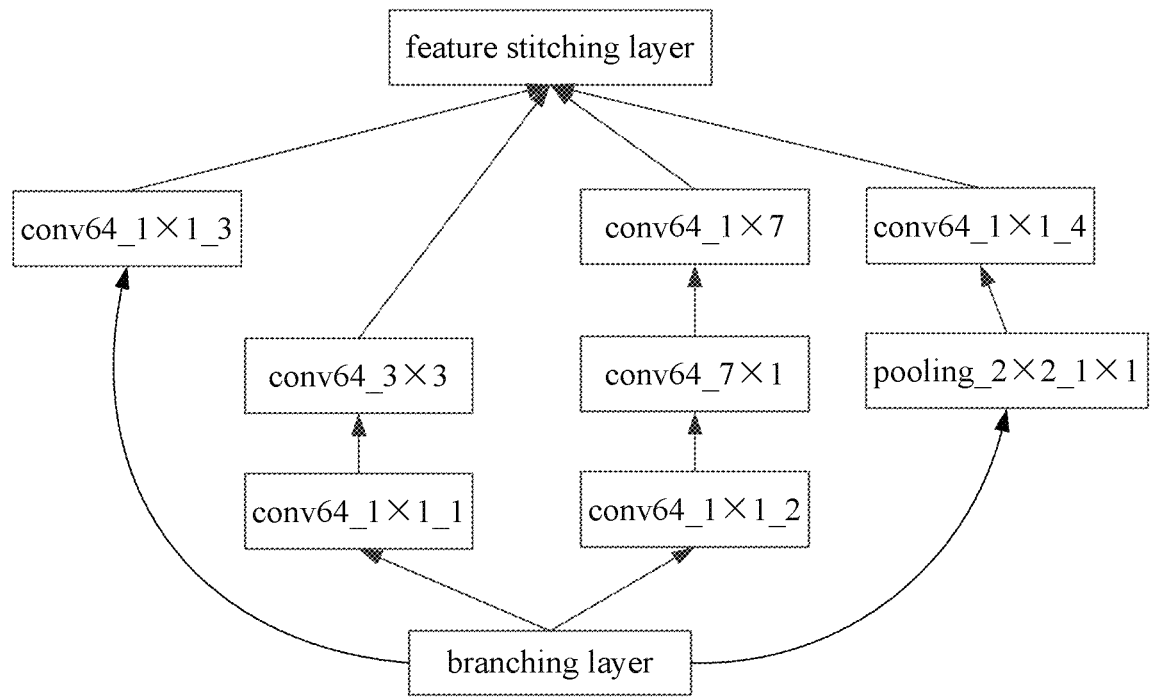
FIG. 6 is a schematic diagram illustrating a third convolution module according to embodiments of the present disclosure.

FIG. 6 is a schematic diagram illustrating a third convolution module according to embodiments of the present disclosure. As illustrated in FIG. 6, the third convolution module includes one branching layer, four convolution layers with the convolution kernels of 1*1 and with 64 filters (denotes as conv64_1×1_1, conv 64_1×1_2, conv64_1×1_3 and conv64_1×1_4 in FIG. 6), one convolution layer with the convolution kernel of 3*3 and with 64 filters (denoted as conv64_3×3), one convolution layer with the convolution kernel of 7*1 and with 64 filters (denotes as conv64_7×1 in FIG. 6) and one convolution layer with the convolution kernel of 1*7 and with 64 filters (denotes as conv64_1×7 in FIG. 6). The convolution layer with the convolution kernel of 7*1 and with 64 filters and the convolution layer with the convolution kernel of 1*7 and with 64 filters may be constructed into one convolution layer with the convolution kernel of 7*7 and with 64 filters. Further, the third convolution module also includes one pooling layer and one feature stitching layer. The scale of the pooling layer is 2*2, and the convolution stride is 1*1, denoted as pooling_2×2_1×1 in FIG. 7. The ½ down-sampling is performed only in the frequency domain for the third convolution module, on the pooling layer.

The branching layer divides a received input into 4 branches. As illustrated in FIG. 6, the first branch passes through the convolution layer with the convolution kernel of 1*1, the convolution layer with the convolution kernel of 3*3 and is input into the feature stitching layer. The second branch passes through the convolution layer with the convolution kernel of 1*1, the convolution layer with the convolution kernel of 7*1, the convolution layer with the convolution kernel of 1*7 and is input into the feature stitching layer. The third branch passes through the convolution layer with the convolution kernel of 1*1 and is input into the feature stitching layer. The fourth layer passes through the pooling layer, the convolution layer with the convolution kernel of 1*1 and is input into the feature stitching layer.

Figure 7:
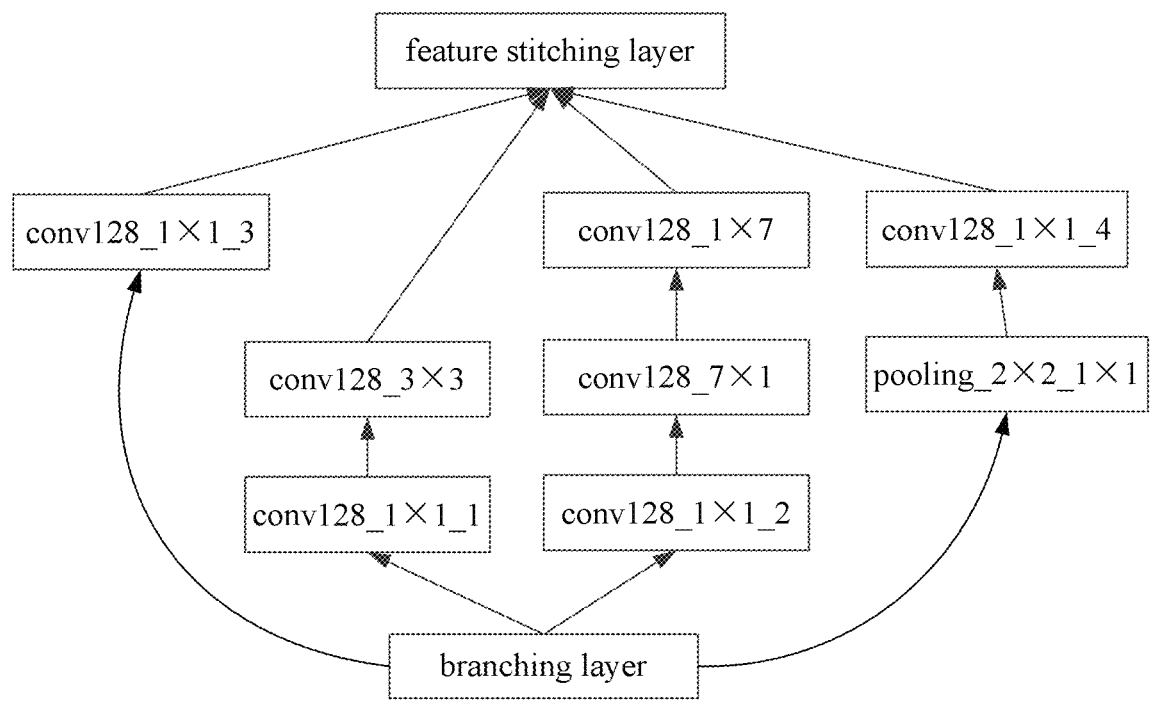
FIG. 7 is a schematic diagram illustrating a fourth convolution module according to embodiments of the present disclosure.

FIG. 7 is a schematic diagram illustrating a fourth convolution layer according to embodiments of the present disclosure. As illustrated in FIG. 7, the fourth convolution module includes: one branching layer, four convolution layers with the convolution kernels of 1*1 and with 128 filters (denoted as conv128_1×1_1, conv128_1×1_2, conv128_1×1_3 and conv128_1×1_4 in FIG. 7), one convolution layer with the convolution kernel of 3*3 and with 128 filters (denoted as conv128_3×3 in FIG. 7), one convolution layer with the convolution kernel of 7*1 and with 128 filters (denoted as conv128_7×1 in FIG. 7) and one convolution layer with the convolution kernel of 1*7 and with 128 filters (denoted as conv128_1×7 in FIG. 7). The convolution layer with the convolution kernel of 7*1 and with 128 filters and the convolution layer with the convolution kernel of 1*7 and with 128 filters are constructed into one convolution layer with the convolution kernel of 7*7 and with 128 filters. Further, the fourth convolution module also includes one pooling layer and one feature stitching layer. The scale of the pooling layer is 2*2 and the convolution stride is 1*1, denoted as pooling _2×2_1×1 in FIG. 7. The ½ down-sampling is performed only in the frequency domain for the fourth convolution module, on the pooling layer.

The branching layer divides a received input into four branches. As illustrated in FIG. 7, the first branch passes through the convolution layer with the convolution kernel of 1*1, the convolution layer with the convolution kernel of 3*3 and is input into the feature stitching layer. The second branch passes through the convolution layer with the convolution kernel of 1*1, the convolution layer with the convolution kernel of 7*1, the convolution layer with the convolution kernel of 1*7 and is input into the feature stitching layer. The third branch passes through the convolution layer with the convolution kernel of 1*1, and is input into the feature stitching layer. The fourth branch passes through the pooling layer, the convolution layer with the convolution kernel of 1*1 and is input into the feature stitching layer.

Alternatively, the convolution kernels of the convolution layer with the convolution kernel of 7*1 and with 64 filters and of the convolution layer with the convolution kernel of 7*1 and with 128 filters may be placed with the convolution kernels of 5*1, and the convolution kernels of the convolution layer with the convolution kernel of 1*7 and with 64 filters and the convolution layer with the convolution kernel of 1*7 and with 128 filters may be placed with the convolution kernels of 1*5. Parameters set previously in the Inception convolution structure are not construed to limit embodiments of the present disclosure.

Further, an output from the feature stitching layer of the first convolution module is input into the branching layer of the second convolution module. An output from the feature stitching layer of the second convolution module is input into the branching layer of the third convolution module. An output from the feature stitching layer of the third convolution module is input into the branching layer of the fourth convolution module.

At act S203, the spectrum analysis is performed on the speech to be recognized to obtain the spectrum diagram of the speech to be recognized.

Details of the process of acquiring the spectrum diagram may be referred as the description of relevant content in above embodiments of the present disclosure, which are not elaborated herein.

At act S204, the features of the spectrum program are extracted by using the Inception convolution structure to obtain the speech feature of the speech to be recognized.

After the spectrum program of the speech to be recognized is acquired, the spectrum program is input into the Inception convolution structure. The Inception convolution structure may recognize the spectrum program to extract the speech feature of the speech to be recognized from the spectrum program.

At act S205, the speech feature extracted is input into the Full Connect (FC for short) layer to perform a speech classification.

After the speech feature is extracted, the speech feature may be input into a next layer (i.e. FC layer). The speech feature is non-linear mapped via the FC layer to perform the speech classification on the speech to be recognized, to obtain the classification of the speech to be recognized.

Figure 8:
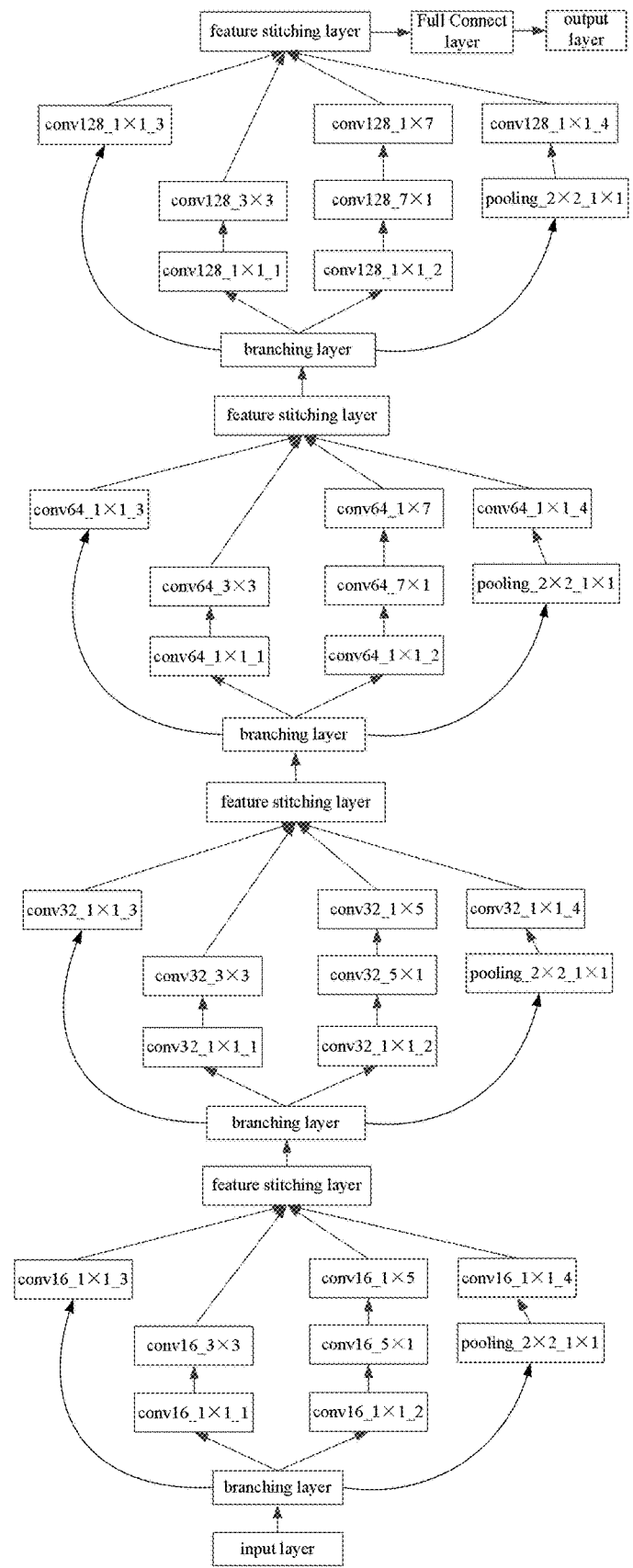
FIG. 8 is a diagram of applying an Inception convolution structure according to embodiments of the present disclosure.

FIG. 8 is a diagram of applying an Inception convolution structure according to embodiments of the present disclosure. As illustrated in FIG. 8, an input layer inputs the spectrum program into the branching layer of the first convolution module. The spectrum program is processed by the convolution layers to enter into the feature stitching layer. The output from the feature stitching layer of the first convolution module is input into the branching layer of the second convolution module. In the same manner, the output from the feature stitching layer of the second convolution module is input into the branching layer of the third convolution module, and the output from the feature stitching layer of the third convolution layer is input into the branching layer of the fourth convolution module. The output from the feature stitching layer of the fourth convolution module is input into the Full Connect layer to perform the speech classification. Then the classification of the speech to be recognized is output via an output layer.

Four pooling layers are used to perform the down-sampling in the Inception convolution structure according to embodiments of the present disclosure. However, the times of performing the down-sampling in the time domain are generally less than that in the frequency domain. For example, the down-sampling is performed once in the time domain for both the first convolution module and the second convolution module, the period of the time domain is reduced to ¼ of the sample period. For example, the speech recognition generally employs 10 ms as a frame shift, that is, the sample period is 10 ms. When the down-sampling is performed in the time domain, the sample period increases to 40 ms. When the down-sampling is performed for four times, the frequency is decreases to ¹⁄₁₆ of the sample frequency. The summed down-sampling rate in the time domain is determined according to the granularity of performing the speech classification on the speech to be recognized. For example, in the acoustic model taking the phones as the modeling unit, ¼ down-sampling in the time domain is suitable in total; in the acoustic model taking the words as the modeling unit, ⅛ down-sampling in the time domain is suitable.

With the method according to embodiments of the present disclosure, by performing the spectrum analysis on the speech to be recognized, the spectrum program of the speech to be recognized is obtained, by extracting the features of the spectrum program via using the Inception convolution structure of the image recognition algorithm, the speech feature of the speech to be recognized is obtained. In embodiments, by performing the spectrum analysis on the speech to be recognized, the consecutive speech to be recognized is converted into the spectrum program. As the Inception convolution structure is an effective image recognition manner being able to accurately recognize features of an image, the spectrum program is recognized with the Inception convolution structure to extract the relative accurate speech feature from the speech to be recognized. Thus, the accuracy rate of the speech recognition is improved. As the Inception convolution structure may extract the speech feature, the Inception convolution structure may be used as an independent speech feature-extracting layer in an acoustic module, thereby overcoming a problem that the accuracy rate of the speech recognition is poor resulting from an absence of the special feature-extracting layer in the acoustic model in the related art.

Figure 9:
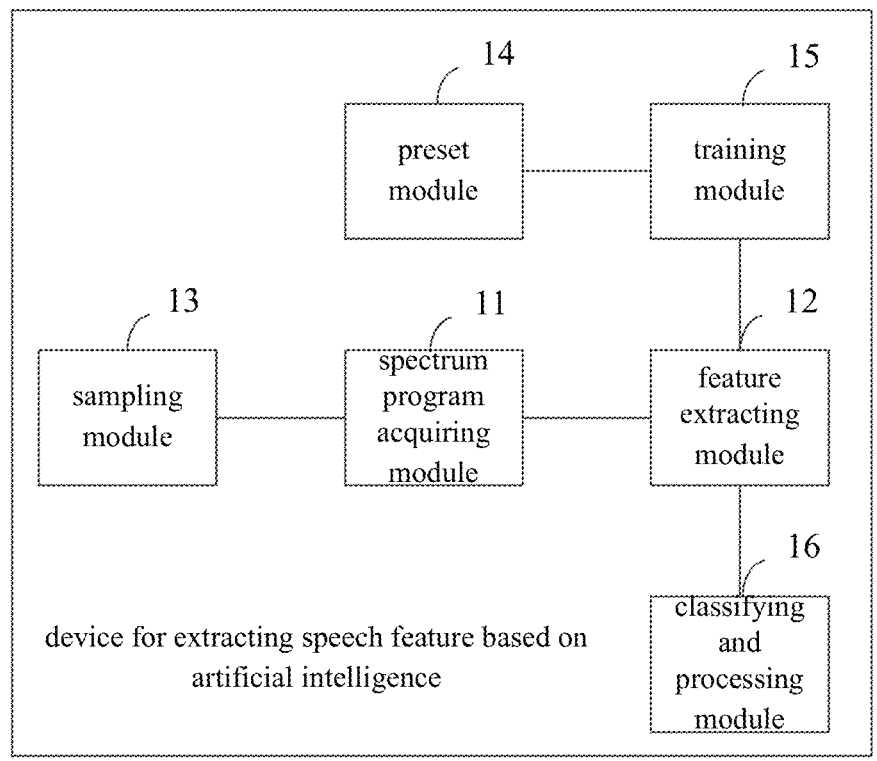
FIG. 9 is a block diagram illustrating a device for extracting a speech feature based on artificial intelligence according to embodiments of the present disclosure.

FIG. 9 is a block diagram illustrating a device for extracting a speech feature based on artificial intelligence according to embodiments of the present disclosure. The device includes: a spectrum program acquiring module 11 and a feature extracting module 12.

The spectrum program acquiring module 11 is configured to perform a spectrum analysis on a speech to be recognized, to obtain a spectrum program of the speech.

The feature extracting module 12 is configured to extract features of the spectrum program by using an Inception convolution structure of an image recognition algorithm, to obtain the speech feature of the speech.

Further, the spectrum program acquiring module 11 is specifically configured to perform a fast Fourier transform on frames included in the speech, to obtain spectrum values of the frames; and to generate the spectrum program with the spectrum values; in which a horizontal coordinate of the spectrum program denotes time corresponding to the frames, a longitudinal coordinate of the spectrum program denotes a frequency component corresponding to the frames, and values of intersections between the horizontal coordinate and the longitudinal coordinate denote the spectrum values.

Further, the device also includes: a sampling module 13.

The sampling module 13 is configured to sample the speech by a preset period, to obtain the frames, and to filter the frames with a filter group including a preset number of filters, to obtain spectrum components of the frames.

Further, the Inception convolution structure includes a plurality of convolution modules, each convolution module includes one branching layer, a plurality of convolution layers, one pooling layer and one feature stitching layer; the one pooling layer is configured to perform a down-sampling in time domain and/or frequency domain; in the plurality of convolution modules, a summed down-sampling rate in the time domain is smaller than the summed down-sampling rate in the frequency domain, on each pooling layer.

Further, the summed down-sampling rate in the time domain is determined according to a granularity of performing a speech classification on the speech.

Further, in the Inception convolution structure, the number of filters included in a poster convolution module is integer multiple of that included in an adjacent former convolution module.

Further, the Inception convolution structure includes four convolution modules, a first convolution module and a second convolution module each include: the one branching layer, four convolution layers with convolution kernels of 1*1, one convolution layer with the convolution kernel of 3*3, one convolution layer with the convolution kernel of 5*1 and one convolution layer with the convolution kernel of 1*5, the one pooling layer and the one feature stitching layer, in which the one convolution layer with the convolution kernel of 5*1 and the one convolution layer with the convolution kernel of 1*5 are constructed into one convolution layer with the convolution kernel of 5*5, a scale of the one pooling layer is 2*2, and a convolution stride is 1*1.

The third convolution module and a fourth convolution module each include: the one branching layer, four convolution layers with convolution kernels of 1*1, one convolution layer with the convolution kernel of 3*3, one convolution layer with the convolution kernel of 7*1 and one convolution layer with the convolution kernel of 1*7, the one pooling layer and the one feature stitching layer, in which the one convolution layer with the convolution kernel of 7*1 and the one convolution layer with the convolution kernel of 1*7 are constructed into one convolution layer with the convolution kernel of 7*7, the scale of the one pooling layer is 2*2, and the convolution stride is 1*1.

Further, the device also includes: a preset module 14 and a training module 15.

The preset module 14 is configured to set the plurality of convolution modules included in the Inception convolution structure previously.

The training module 15 is configured to train the Inception convolution structure that is already set.

Further, the device also includes a classifying and processing module 16.

The classifying and processing module 16 is configured to perform a speech classification on the speech feature by inputting the speech feature into a full connect layer In embodiments, by performing the spectrum analysis on the speech to be recognized, the consecutive speech to be recognized is converted into the spectrum diagram. As the Inception convolution structure may be an effective image recognition manner being able to accurately recognize features of an image, the spectrum program is recognized with the Inception convolution structure to extract the relative accurate speech feature from the speech to be recognized. Thus, the accuracy rate of the speech recognition is improved. As the Inception convolution structure may extract the speech feature, the Inception convolution structure may be used as an independent speech feature-extracting layer in an acoustic model, thereby overcoming a problem that the accuracy rate of the speech recognition is poor resulting from an absence of the special feature-extracting layer in the acoustic model in the related art.

Figure 10:
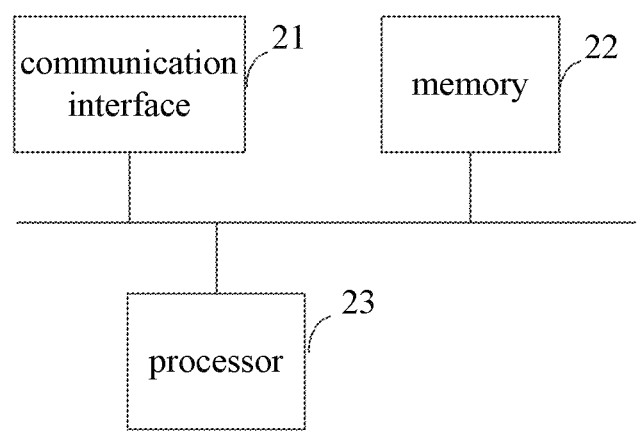
FIG. 10 is a block diagram illustrating another device for extracting a speech feature based on artificial intelligence according to embodiments of the present disclosure.

FIG. 10 is a block diagram illustrating another device for extracting a speech feature based on artificial intelligence according to embodiments of the present disclosure. The device includes: a communication interface 21, a memory 22, a processor 23 and computer programs stored in the memory 22 and executable by the processor 23.

The processor 23 is configured to execute the computer programs to achieve the method for extracting a speech feature based on artificial intelligence according to any one of the above embodiments of the present disclosure.

The communication interface 21 is configured to communicate between the memory 22 and the processor 23.

The memory 22 is configured to store the computer programs executable by the processor 23. The memory 22 may contain a high-speed RAM memory, a non-volatile memory, such as a disk memory.

The processor 23 is configured to execute the computer programs to achieve the method for extracting a speech feature based on artificial intelligence according to the above embodiments.

If the communication interface 21, the memory 22 and the processor 23 are implemented independently, the communication interface 21, the memory 22 and the processor 23 may communicate and connect with each other via a bus. The bus may be an Industry Standard Architecture (ISA) bus, a Peripheral Component (PCI) bus, an Extended Industry Standard Architecture (EISA) bus or the like. The bus may be divided into an address bus, a data bus, a control bus and the like. For illustrating simply, only one thick line is illustrated in FIG. 10, which does not mean that there is only one bus or only one type of buses.

Alternatively, for specifically implementation, if the communication interface 21, the memory 22 and the processor 23 are integrated into one chip, the communication interface 21, the memory 22 and the processor 23 may communicate with each other via internal interfaces.

The processor 23 may be a Central Processing Unit (CPU), an Application Specific Integrated Circuit (ASIC) or may be configured as one or more integrated circuits for implementing the embodiments of the present disclosure.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means at least two, such as two, three etc., unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for extracting a speech feature based on artificial intelligence, wherein the speech feature is used for a speech recognition, and the method comprises:
    performing, by at least one computing device, a spectrum analysis on a speech to be recognized, to obtain a spectrum program of the speech; and
    extracting, by the at least one computing device, features of the spectrum program by using an Inception convolution structure of an image recognition algorithm, to obtain the speech feature of the speech;
    wherein the Inception convolution structure comprises a plurality of convolution modules, each of the plurality of convolution modules comprises one branching layer, a plurality of convolution layers, one pooling layer and one feature stitching layer; the one pooling layer is configured to perform a down-sampling in time domain and/or frequency domain; in the plurality of convolution modules, a summed down-sampling rate in the time domain is smaller than a summed down-sampling rate in the frequency domain, on each pooling layer.

2. The method according to claim 1, wherein performing, by the at least one computing device, a spectral analysis on a speech to be recognized, to obtain a spectrum program of the speech comprises:
    performing, by the at least one computing device, a fast Fourier transform on frames comprised in the speech, to obtain spectrum values of the frames; and
    generating, by the at least one computing device, the spectrum program with the spectrum values; wherein a horizontal coordinate of the spectrum program denotes time corresponding to the frames, a longitudinal coordinate of the spectrum program denotes a frequency component corresponding to the frames, and values of intersections between the horizontal coordinate and the longitudinal coordinate denote the spectrum values.

3. The method according to claim 2, before performing, by the at least one computing device, a fast Fourier transform on frames comprised in the speech, to obtain spectrum values of the frames, comprising:
    sampling, by the at least one computing device, the speech by a preset period, to obtain the frames; and
    filtering, by the at least one computing device, the frames by using a filter group comprising a preset number of filters, to obtain spectrum components of the frames.

4. The method according to claim 1, wherein the summed down-sampling rate in the time domain is determined according to a granularity of performing a speech classification on the speech.

5. The method according to claim 1, wherein in the Inception convolution structure, the number of filters comprised in a poster convolution module is integer multiple of that comprised in an adjacent former convolution module.

6. The method according to claim 1, wherein the Inception convolution structure comprises four convolution modules, a first convolution module and a second convolution module each comprise: the one branching layer, four convolution layers with convolution kernels of 1*1, one convolution layer with the convolution kernel of 3*3, one convolution layer with the convolution kernel of 5*1 and one convolution layer with the convolution kernel of 1*5, the one pooling layer and the one feature stitching layer, wherein the one convolution layer with the convolution kernel of 5*1 and the one convolution layer with the convolution kernel of 1*5 are constructed into one convolution layer with the convolution kernel of 5*5, a scale of the one pooling layer is 2*2, and a convolution stride is 1*1; and
    a third convolution module and a fourth convolution module each comprise: the one branching layer, four convolution layers with convolution kernels of 1*1, one convolution layer with the convolution kernel of 3*3, one convolution layer with the convolution kernel of 7*1 and one convolution layer with the convolution kernel of 1*7, the one pooling layer and the one feature stitching layer, wherein the one convolution layer with the convolution kernel of 7*1 and the one convolution layer with the convolution kernel of 1*7 are constructed into one convolution layer with the convolution kernel of 7*7, the scale of the one pooling layer is 2*2, and the convolution stride is 1*1.

7. The method according to claim 1, before extracting, by the at least one computing device, features of the spectrum program by using an Inception convolution structure of an image recognition algorithm, further comprising:
  setting, by the at least one computing device, the plurality of convolution modules comprised in the Inception convolution structure previously; and
  training, by the at least one computing device, the Inception convolution structure that is already set.

8. The method according to claim 1, after extracting, by the at least one computing device, features of the spectrum program by using an Inception convolution structure of an image recognition algorithm, to obtain the speech feature of the speech, further comprising:
  performing, by the at least one computing device, a speech classification on the speech feature by inputting the speech feature into a full connect layer.

9. A device for extracting a speech feature based on artificial intelligence, comprising:
  a processor;
  a memory, configured to store instructions executable by the processor; wherein the processor is configured to:
    perform a spectrum analysis on a speech to be recognized, to obtain a spectrum program of the speech; and
    extract features of the spectrum program by using an Inception convolution structure of an image recognition algorithm, to obtain the speech feature of the speech;
    wherein the Inception convolution structure comprises a plurality of convolution modules, each of the plurality of convolution modules comprises one branching layer, a plurality of convolution layers, one pooling layer and one feature stitching layer; the one pooling layer is configured to perform a down-sampling in time domain and/or frequency domain; in the plurality of convolution modules, a summed down-sampling rate in the time domain is smaller than a summed down-sampling rate in the frequency domain, on each pooling layer.

10. The device according to claim 9, wherein the processor is configured to perform a spectral analysis on a speech to be recognized, to obtain a spectrum program of the speech by acts of:
  performing a fast Fourier transform on frames comprised in the speech, to obtain spectrum values of the frames; and
  generating the spectrum program with the spectrum values; wherein a horizontal coordinate of the spectrum program denotes time corresponding to the frames, a longitudinal coordinate of the spectrum program denotes a frequency component corresponding to the frames, and values of intersections between the horizontal coordinate and the longitudinal coordinate denote the spectrum values.

11. The device according to claim 10, wherein the processor is further configured to:
  sample the speech by a preset period, to obtain the frames; and
  filter the frames by using a filter group comprising a preset number of filters, to obtain spectrum components of the frames.

12. The device according to claim 9, wherein the summed down-sampling rate in the time domain is determined according to a granularity of performing a speech classification on the speech.

13. The device according to claim 9, wherein in the Inception convolution structure, the number of filters comprised in a poster convolution module is integer multiple of that comprised in an adjacent former convolution module.

14. The device according to claim 9, wherein the Inception convolution structure comprises four convolution modules, a first convolution module and a second convolution module each comprise: the one branching layer, four convolution layers with convolution kernels of $1*1$, one convolution layer with the convolution kernel of $3*3$, one convolution layer with the convolution kernel of $5*1$ and one convolution layer with the convolution kernel of $1*5$, the one pooling layer and the one feature stitching layer, wherein the one convolution layer with the convolution kernel of $5*1$ and the one convolution layer with the convolution kernel of $1*5$ are constructed into one convolution layer with the convolution kernel of $5*5$, a scale of the one pooling layer is $2*2$, and a convolution stride is $1*1$; and
  a third convolution module and a fourth convolution module each comprise: the one branching layer, four convolution layers with convolution kernels of $1*1$, one convolution layer with the convolution kernel of $3*3$, one convolution layer with the convolution kernel of $7*1$ and one convolution layer with the convolution kernel of $1*7$, the one pooling layer and the one feature stitching layer, wherein the one convolution layer with the convolution kernel of $7*1$ and the one convolution layer with the convolution kernel of $1*7$ are constructed into one convolution layer with the convolution kernel of $7*7$, the scale of the one pooling layer is $2*2$, and the convolution stride is $1*1$.

15. The device according to claim 9, wherein the processor is further configured to:
  set the plurality of convolution modules comprised in the Inception convolution structure previously; and
  train the Inception convolution structure that is already set.

16. The device according to claim 9, wherein the processor is further configured to:
  perform a speech classification on the speech feature by inputting the speech feature into a full connect layer.

17. A non-transitory computer readable storage medium, with a computer program stored, wherein the computer program is executed by a processor to achieve a method for extracting a speech feature based on artificial intelligence, and the method comprises:
  performing a spectrum analysis on a speech to be recognized, to obtain a spectrum program of the speech; and
  extracting features of the spectrum program by using an Inception convolution structure of an image recognition algorithm, to obtain the speech feature of the speech;
  wherein the Inception convolution structure comprises a plurality of convolution modules, each of the plurality of convolution modules comprises one branching layer, a plurality of convolution layers, one pooling layer and one feature stitching layer; the one pooling layer is configured to perform a down-sampling in time domain and/or frequency domain; in the plurality of convolution modules, a summed down-sampling rate in the time domain is smaller than a summed down-sampling rate in the frequency domain, on each pooling layer.

18. The non-transitory computer readable storage medium according to claim 17, wherein performing a spectral analysis on a speech to be recognized, to obtain a spectrum program of the speech comprises:
  performing a fast Fourier transform on frames comprised in the speech, to obtain spectrum values of the frames; and generating the spectrum program with the spectrum values; wherein a horizontal coordinate of the spectrum program denotes time corresponding to the frames, a longitudinal coordinate of the spectrum program denotes a frequency component corresponding to the frames, and values of intersections between the horizontal coordinate and the longitudinal coordinate denote the spectrum values.

* * * * *